US008532125B2

(12) United States Patent
Li et al.

(10) Patent No.: US 8,532,125 B2
(45) Date of Patent: Sep. 10, 2013

(54) METHOD, SYSTEM AND APPARATUS FOR SESSION ASSOCIATION

(75) Inventors: Yan Li, Beijing (CN); Xu Xia, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 195 days.

(21) Appl. No.: 13/102,625

(22) Filed: May 6, 2011

(65) Prior Publication Data

US 2011/0211574 A1 Sep. 1, 2011

Related U.S. Application Data

(63) Continuation of application No. PCT/CN2009/073715, filed on Sep. 3, 2009.

(30) Foreign Application Priority Data

Nov. 7, 2008 (CN) .......................... 2008 1 0176059

(51) Int. Cl.
*H04L 12/28* (2006.01)
*H04L 12/56* (2011.01)

(52) U.S. Cl.
USPC .......................................... 370/401; 370/392

(58) Field of Classification Search
USPC .......................................... 370/389, 392, 401
See application file for complete search history.

(56) References Cited

U.S. PATENT DOCUMENTS

| 2006/0251066 | A1 | 11/2006 | Uusikartano et al. |
| 2007/0036311 | A1* | 2/2007 | Foll et al. ................. 379/114.28 |
| 2007/0047516 | A1 | 3/2007 | Kottilingal |
| 2008/0256251 | A1* | 10/2008 | Huotari et al. ............... 709/229 |
| 2009/0305684 | A1* | 12/2009 | Jones et al. .................... 455/418 |

FOREIGN PATENT DOCUMENTS

| CN | 101175248 A | 5/2008 |
| CN | 101222776 A | 7/2008 |
| CN | 101286915 A | 10/2008 |
| CN | 101291322 A | 10/2008 |
| WO | WO 02/03718 A2 | 1/2002 |
| WO | WO 2008089687 | * 7/2008 |

OTHER PUBLICATIONS

1$^{st}$ Office Action in corresponding Chinese Application No. 200810176059.0 (Jun. 24, 2011).
Extended European Search Report in corresponding European Application No. 09824376.9 (Jul. 4, 2011).

(Continued)

*Primary Examiner* — Ronald Abelson
(74) *Attorney, Agent, or Firm* — Leydig, Voit & Mayer, Ltd.

(57) ABSTRACT

A session association method, system, and apparatus are disclosed. The method includes: receiving an Internet Protocol Connectivity Access Network (IP-CAN) session setup message and a gateway control session message; and associating an IP-CAN session with a gateway control session according to a temporary identity (ID) in the IP-CAN session setup message and the temporary ID in the gateway control session message. Therefore, the gateway control session is associated with the IP-CAN session by using a temporary ID; and the gateway control session is associated with the IP-CAN session when no user ID exists in the emergency service, which ensures the normal progress of the emergency service.

11 Claims, 7 Drawing Sheets

(56) References Cited

OTHER PUBLICATIONS

"C3-081764—Change Request," 3GPP TSG-CT WG3 Meeting #49, Oct. 6-8, 2008, 3$^{rd}$ Generation Partnership Project, Phoenix, Arizona.
"3GPP TR 29.804—3$^{rd}$ Generation Partnership Project; Technical Specification Group Core Network and Terminals; CT WG3 aspect of 3GPP System Architecture Evolution: (Stage 3); Release 8," Version 2.0.0, Sep. 2008, 3$^{rd}$ Generation Partnership Project, Valbonne, France.
Written Opinion of the International Searching Authority in corresponding PCT Application No. PCT/CN2009/073715 (Dec. 17, 2009).
International Search Report in corresponding PCT Application No. PCT/CN2009/073715 (Dec. 17, 2009).

\* cited by examiner

METHOD, SYSTEM AND APPARATUS FOR SESSION ASSOCIATION

CROSS-REFERENCE TO RELATED APPLICATIONS

This application is a continuation of International Application No. PCT/CN2009/073715, filed on Sep. 3, 2009, which claims priority to Chinese Patent Application No. 200810176059.0, filed on Nov. 7, 2008, both of which are hereby incorporated by reference in their entireties.

FIELD OF THE INVENTION

The present invention relates to communication technologies, and in particular, to a session association method, system, and apparatus.

BACKGROUND OF THE INVENTION

As the service requirements (such as multimedia call, file downloading, web browse, and streaming service) of users and operators are diversified, the network resources need to bear huge quantities of transmission services that require different Quality of Service (QoS) levels. To enable the limited network resources to bear such transmission services and exercise effective control on the transmission services that require different QoS levels, the policy control may be combined with the charging control to meet the urgent need of diversifying the profit models of operators; and Policy and Charging Control (PCC) architecture may be applied to meet different QoS control and charging requirements. In this way, the users have richer service experiences and operators have new growth points.

In the prior art, the PCC architecture includes a Policy and Charging Rules Function (PCRF), a Policy and Charging Enforcement Function (PCEF), and a Bearer Binding and Event Reporting Function (BBERF). A gateway control session is set up between the BBERF and the PCRF, and an IP-Connectivity Access Network (IP-CAN) session is set up between the PCEF and the PCRF; and a Diameter Routing Agent (DRA) (next-generation 3A protocol routing agent) associates the gateway control session and the IP-CAN session with the same PCRF according to the user identity (ID), and the PCRF associates the gateway control session with the IP-CAN session. In this way, it is ensured that the policy information is delivered to the corresponding gateway control session and the IP-CAN session, and that the user ID is globally unique, namely, it is impossible that two users use the same user ID. The user ID is stored in a Subscriber Identity Module (SIM) or a Universal Subscriber Identity Module (USIM).

In the process of implementing the present invention, the inventor finds at least the following problems in the prior art:

The association between the gateway control session and the IP-CAN session in the prior art is based on the user ID, and the user ID is stored in a SIM/USIM card; when an emergency service occurs, the SIM/USIM card may not exist or be invalid, namely, no user ID exists. Consequently, the DRA is unable to select different PCRFs according to different users; the PCRF is unable to associate the gateway control session with the IP-CAN session of the same user and unable to deliver policies correctly; and the QoS of the emergency service is not ensured.

SUMMARY OF THE INVENTION

Embodiments of the present invention provide a session association method, system, and apparatus to associate a gateway control session with an IP-CAN session when no user ID exists in an emergency service.

To achieve the foregoing objectives, a session association method provided in an embodiment of the present invention includes:

receiving an IP-CAN session setup message and a gateway control session message; and associating an IP-CAN session with a gateway control session according to a temporary ID in the IP-CAN session setup message and the temporary ID in the gateway control session message.

A session association system provided in an embodiment of the present invention includes:

a BBERF, configured to send a gateway control session message to a PCRF;

a PCEF, configured to send an IP-CAN session setup message to the PCRF; and the PCRF, configured to associate an IP-CAN session with a gateway control session according to a temporary ID in the IP-CAN session setup message and the temporary ID in the gateway control session message.

A session association apparatus provided in an embodiment of the present invention includes:

a receiving module, configured to receive an IP-CAN session setup message and a gateway control session message; and an associating module, configured to associate an IP-CAN session with a gateway control session according to a temporary ID in the IP-CAN session setup message and the temporary ID in the gateway control session message.

Compared with the prior art, the embodiments of the present invention bring the following benefits: The gateway control session is associated with the IP-CAN session by using a temporary ID or an IP address allocated to the user; therefore, the gateway control session is associated with the IP-CAN session when no user ID exists in the emergency service, and the normal progress of the emergency service is ensured.

BRIEF DESCRIPTION OF THE DRAWINGS

To make the technical solution under the present invention clearer, the accompanying drawings for illustrating the embodiments of the present invention or the prior art are described below. Apparently, the accompanying drawings are exemplary only, and persons having ordinary skill in the art can derive other drawings from such accompanying drawings without any creative effort.

DETAILED DESCRIPTION OF THE EMBODIMENTS

The technical solution under the present invention is described below with reference to the embodiments and accompanying drawings. Evidently, the embodiments described below are exemplary only, without covering all embodiments of the present invention. All other embodiments, which can be derived by those skilled in the art from the embodiments provided herein without any creative efforts, shall fall within the scope of the present invention.

Figure 1:
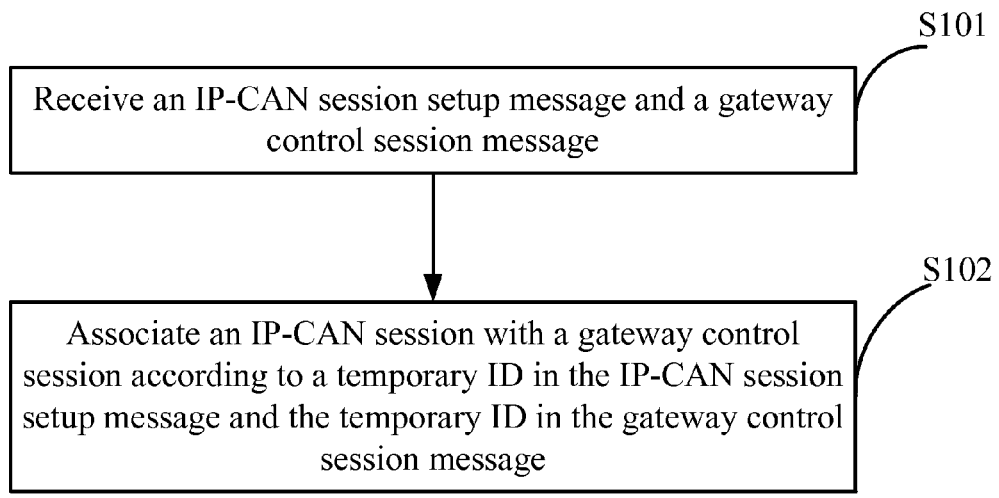
FIG. 1 is a flowchart of a session association method provided in a first embodiment of the present invention.

As shown in FIG. 1, a session association method provided in the first embodiment of the present invention includes the following steps:

Step S101: Receive an IP-CAN session setup message and a gateway control session message.

Step S102: Associate an IP-CAN session with a gateway control session according to a temporary ID in the IP-CAN session setup message and a temporary ID in the gateway control session message.

The gateway control session message may be a gateway control session setup message or a gateway control session update message; the temporary ID may be (but is not limited to) a temporary global ID, a sequence number in a Proxy Binding Update (PBU) message, or an IP address allocated to the user.

Associating the IP-CAN session with the gateway control session according to a temporary ID in the IP-CAN session setup message and a temporary ID in the gateway control session message includes: associating the IP-CAN session with the gateway control session according to a temporary global ID in the IP-CAN session setup message and a temporary global ID in the gateway control session message; or associating the IP-CAN session with the gateway control session according to a sequence number in the PBU message in the IP-CAN session setup message or a sequence number in the PBU message in the gateway control session message; or associating the IP-CAN session with the gateway control session according to an IP address allocated to the user in the IP-CAN session setup message and an IP address allocated to the user in the gateway control session message.

Further, associating the IP-CAN session with the gateway control session according to an IP address allocated to the user in the IP-CAN session setup message and an IP address allocated to the user in the gateway control session message includes: receiving a gateway control session update message from a BBERF; and associating the IP-CAN session with the gateway control session according to the IP address allocated to the user in the IP-CAN session setup message and the IP address allocated to the user in the gateway control session update message if the gateway control session update message carries an IP address allocated by the PCEF to the user.

Therefore, in this embodiment, the gateway control session is associated with the IP-CAN session by using a temporary ID; and the gateway control session is associated with the IP-CAN session when no user ID exists in an emergency service, which ensures the normal progress of the emergency service.

Figure 2:
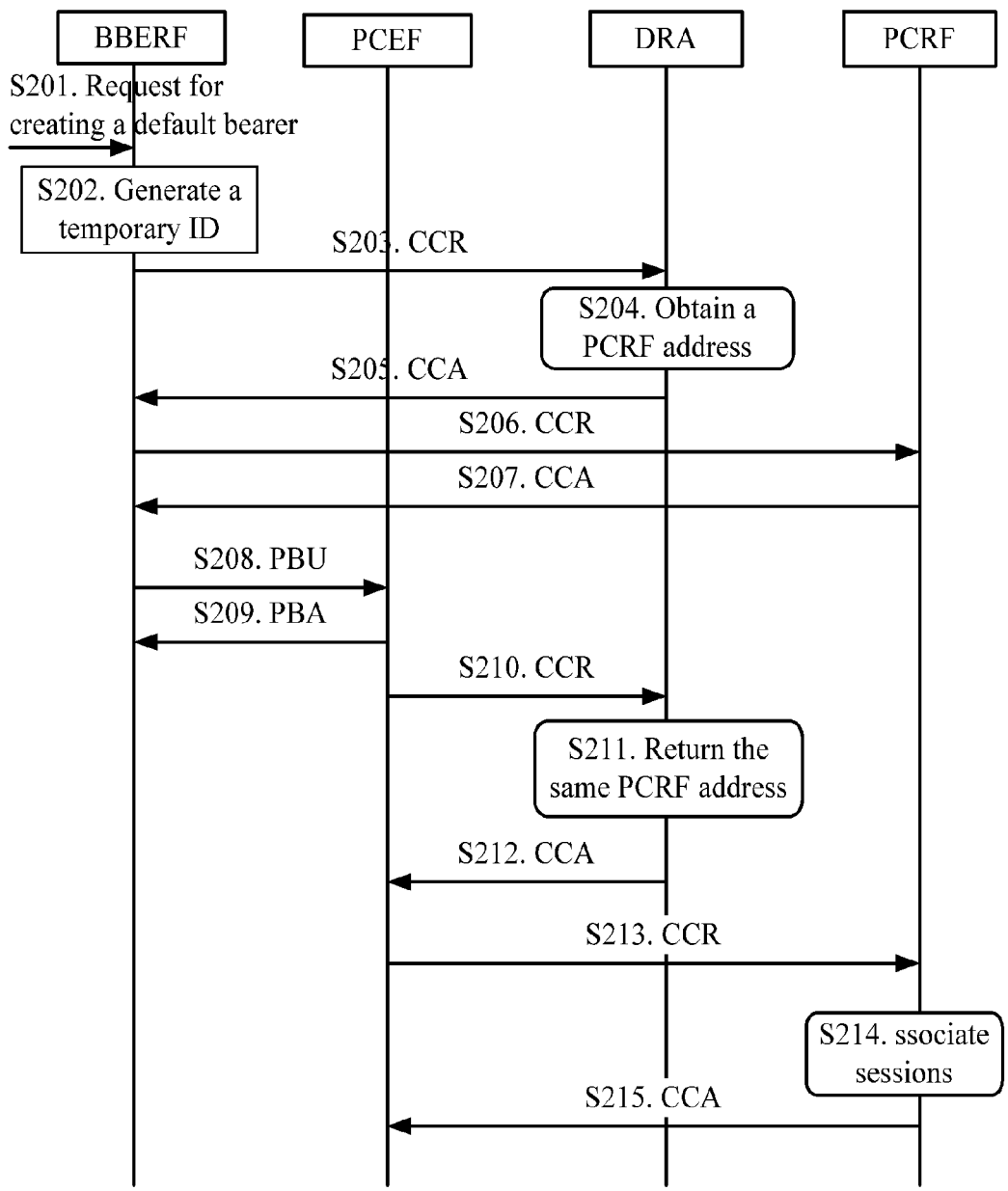
FIG. 2 is a flowchart of a session association method provided in a second embodiment of the present invention.

A session association method is provided in the second embodiment of the present invention. In this embodiment, no user ID exists in an emergency service. That is, the SIM/USIM card in the emergency service does not exist or is invalid. For example, no roaming agreement is signed between a visited network and a home network. In this embodiment, when the BBERF determines that the emergency service has no user ID, the BBERF generates an ID temporarily when initiating a gateway control session to the PCRF. The ID temporarily generated may be (but is not limited to): a globally unique ID (different IDs are allocated to different users who are performing an emergency service but have no user ID); and a unique ID inside the BBERF (different IDs are allocated to different users who are performing an emergency service but have no user ID inside the same BBERF). This ID is sent to the PCEF through a PBU message to the PCEF, and the IP-CAN session setup message sent by the PCEF carries this ID. The PCRF associates the gateway control session with the IP-CAN session according to this ID. As shown in FIG. 2, the method includes the following steps:

Step S201: The BBERF receives a request for creating a default bearer. The request carries an Access Point Name (APN) of the emergency service and an International Mobile Station Equipment Identity (IMEI) of the emergency service.

Specifically, the request for creating the default bearer indicates that the default bearer is used for an emergency service, and carries only the IMEI of the emergency service. The request indicates that the user has no valid user ID. The BBERF is a functional entity. It may be a specific module and may be located on the access network gateway, for example, a serving gateway in a System Architecture Evolved (SAE) network, a Serving GPRS Support Node (SGSN), or an HRPD Serving Gateway (HSGW) of the 3rd Generation Partnership Project 2 (3GPP2). The BBERF may enforce the QoS policy delivered by the PCRF and exercise QoS control. The QoS control includes: detection of service data flows, bearer binding, and uplink bearer verification.

Step S202: When the BBERF determines that the service is an emergency service and that the user has no valid user ID, the BBERF generates a temporary ID.

Step S203: The BBERF sends a gateway control session setup request (that is, Credit Control Request which is CCR for short) message to the DRA. The message carries the temporary ID and the APN of the emergency service.

Step S204: After receiving the CCR message, the DRA determines that the service is an emergency service and that the user has no valid user ID according to the emergency service APN carried in the CCR message. The DRA selects a PCRF capable of handling emergency services in this domain for the gateway control session.

Specifically, if multiple PCRFs in this domain are capable of handling emergency services, the DRA may select one of the PCRFs, and generate an index for recording an association between the PCRF address and the temporary ID. The PCRF implements the functions such as PCC decision and flow-based charging control, and formulates corresponding PCC policies according to operator policies, subscription data of the user (obtained from a Subscription Profile Repository which is SPR for short), current service information of the user (obtained from an Application Function which is AF for short), and local information (obtained from the PCEF). The PCC policies include rules for detecting service data flows (namely, a sorted collection of IP flows for implementing a service such as voice communications), gating status (that is, enabling or disabling of packet data transmission), QoS rules, and flow-based charging rules. The PCRF also provides the function of subscribing to and reporting the events between the PCRF and other connected functional entities. The PCRF finally delivers the PCC policies to the PCEF for enforcement, or delivers QoS policies among the PCC policies to the BBERF for enforcement.

Step S205: The DRA returns the address information of the PCRF to the BBERF through a response (Credit Control Answer which is CCA for short) message.

Step S206: The BBERF sends a gateway control session setup request message (that is, CCR) to the PCRF corresponding to the returned PCRF address. This message carries the temporary ID and the APN of the emergency service.

Step S207: The PCRF returns a response message.

Step S208: The BBERF sends a PBU message to the PCEF. The message carries the temporary ID and the APN of the emergency service.

Specifically, the PCEF is located in a Packet Data Network (PDN) Gateway (GW), for example, a PDN GW in an SAE network, or a Gateway GPRS Support Node (GGSN) in a GPRS network, or a PDN GW in a 3GPP2 network. The PCEF enforces the PCC policies delivered by the PCRF or predefined by an operator. Specifically, the PCEF binds the PCC policies, namely, detects and measures the service data flows by using the information in the PCC policies, performs gating, ensures the QoS of the service data flows, processes the user-plane traffic, and triggers the control-plane session management.

Step S209: The PCEF returns a Proxy Binding Acknowledgement (PBA) message. The message carries the IP address allocated by the PCEF to the user.

Step S210: The PCEF sends an IP-CAN session setup request message (that is, CCR) to the DRA. The message carries the temporary ID, the APN of the emergency service, and the IP address allocated to the user.

Step S211: When the DRA determines that the service is an emergency service and that the user has no valid user ID according to the APN of the emergency service, the DRA selects a PCRF capable of handling emergency services in this domain for the IP-CAN session. The PCRF is responsible for handling emergency services.

Specifically, if multiple PCRFs in this domain are capable of handling emergency services, the DRA searches the index table according to the temporary ID, and returns the PCRF address which is the same as that in step S204.

Step S212: The DRA returns the address information of the PCRF to the PCEF through a response message (that is, CCA).

Step S213: The PCEF sends an IP-CAN session setup request message (that is, CCR) to the PCRF corresponding to the returned PCRF address. The message carries the temporary ID, the APN of the emergency service, and the IP address allocated to the user.

Step S214: The PCRF associates the IP-CAN session with the gateway control session according to the temporary ID in the IP-CAN session setup request message and the temporary ID in the gateway control session setup message.

Step S215: The PCRF returns a response message to the PCEF.

Therefore, in this embodiment, the gateway control session is associated with the IP-CAN session by using a temporary ID; and the gateway control session is associated with the IP-CAN session when no user ID exists in the emergency service, which ensures the normal progress of the emergency service.

Figure 3:
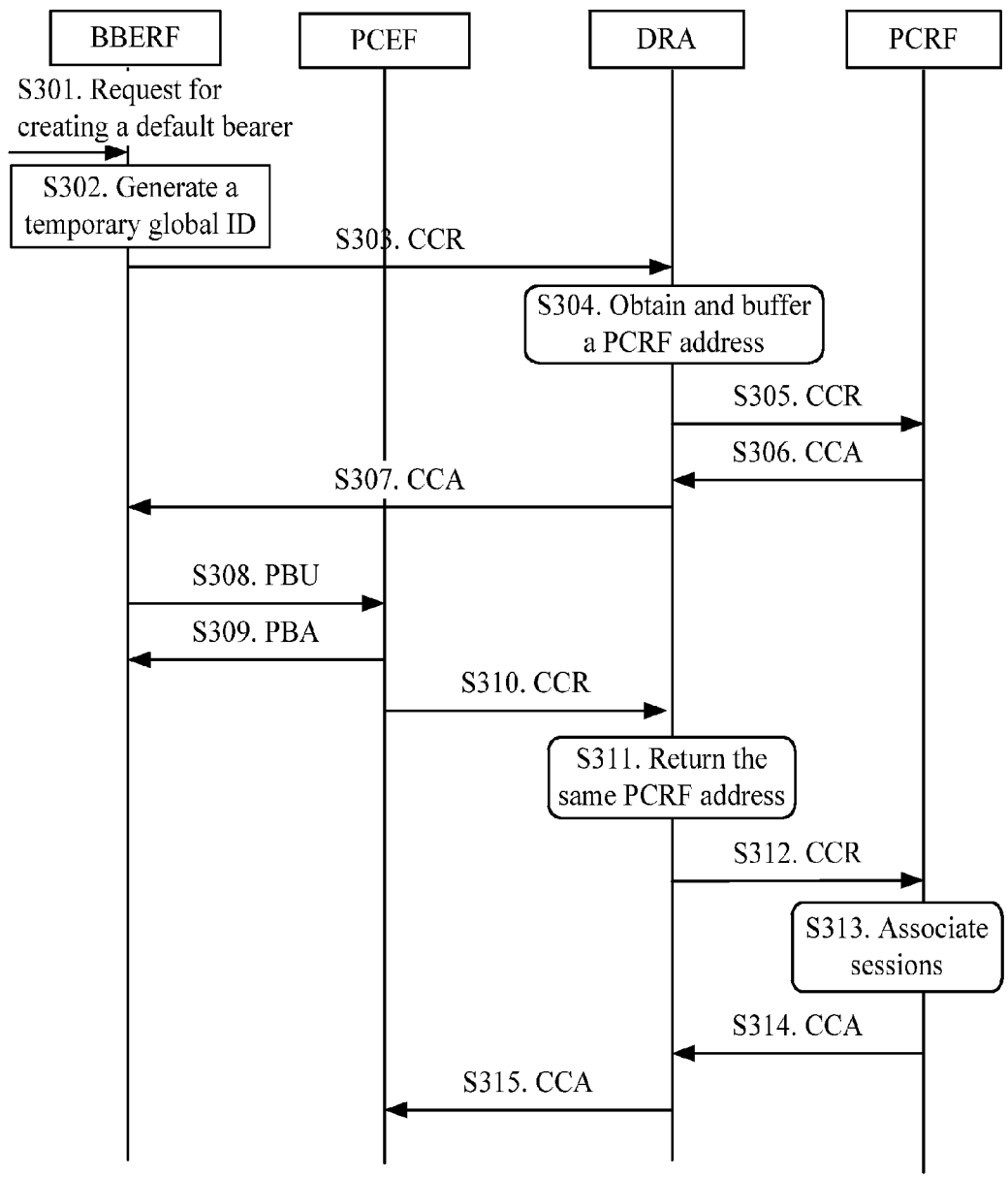
FIG. 3 is a flowchart of a session association method provided in a third embodiment of the present invention.

A session association method is provided in the third embodiment of the present invention. In this embodiment, an emergency service has no user ID, and the BBERF generates a global ID temporarily and uses it for associating the IP-CAN session with the gateway control session. In this embodiment, the DRA is based on a proxy solution, and the DRA selects a unique PCRF for handling the emergency service. As shown in FIG. 3, the method includes the following steps:

Step S301: The BBERF receives a request for creating a default bearer. The request carries an APN of the emergency service and an IMEI of the emergency service.

Specifically, the request for creating the default bearer indicates that the default bearer is used for an emergency service, and carries only the IMEI of the emergency service. The request indicates that the user has no valid user ID. The BBERF is a functional entity. It may be a specific module and may be located on the access network gateway.

Step S302: When the BBERF determines that the service is an emergency service and that the user has no valid user ID, the BBERF generates a temporary ID.

Specifically, the ID is globally unique, namely, a temporary ID allocated in a different BBERF differs. The generation mode may be (but is not limited to): generating a temporary global ID.

The temporary global ID carries at least a BBERF ID and the time of receiving the request for creating the default bearer; the BBERF ID is used to identify a BBERF, and the time of receiving the request for creating the default bearer is used to identify the user under the same BBERF. In this way, the temporary ID is globally unique. Alternatively, the temporary global ID carries a BBERF ID and a preset integer. The preset integer may have 32 digits, 64 digits or 128 digits. The specific value of the integer depends on the actual conditions, and is not limited. Different integers are allocated to different users under the same BBERF, therefore ensuring the temporary ID to be globally unique.

Step S303: The BBERF sends a gateway control session setup request message (that is, CCR) to the DRA. This message carries the temporary global ID and the APN of the emergency service.

Step S304: After receiving the CCR message, the DRA determines that the service is an emergency service and that the user has no valid user ID according to the emergency service APN carried in the CCR message. The DRA selects a PCRF capable of handling emergency services in this domain for the gateway control session.

Step S305: The DRA forwards the gateway control session setup request to the selected PCRF.

Step S306: The PCRF returns a response message to the DRA.

Step S307: The DRA forwards the response message to the BBERF.

Step S308: The BBERF sends a PBU message to the PCEF. The message carries the temporary global ID and the APN of the emergency service.

Specifically, the PBU message may be extended to support transmission of the temporary global ID.

Step S309: The PCEF returns a PBA message. The message carries the IP address allocated by the PCEF to the user.

Step S310: The PCEF sends an IP-CAN session setup request message (that is, CCR) to the DRA. The message carries the temporary global ID, the APN of the emergency service, and the IP address allocated to the user.

Step S311: When the DRA determines that the service is an emergency service and that the user has no valid user ID according to the APN of the emergency service, the DRA selects a PCRF capable of handling emergency services in this domain for the IP-CAN session.

Specifically, if multiple PCRFs in this domain are capable of handling emergency services, the DRA searches the index table according to the temporary ID, and returns the PCRF address which is the same as that in step S304.

Step S312: The DRA forwards the IP-CAN session setup request message (that is, CCR) to the PCRF.

Step S313: The PCRF associates the IP-CAN session with the gateway control session according to the temporary global ID in the IP-CAN session setup request message and the temporary global ID in the gateway control session setup request message.

Step S314: The PCRF returns a response message to the DRA.

Step S315: The DRA forwards the response message to the PCEF.

Therefore, in this embodiment, the gateway control session is associated with the IP-CAN session by using a temporary global ID; and the gateway control session is associated with the IP-CAN session when no user ID exists in the emergency service, which ensures the normal progress of the emergency service.

Figure 4:
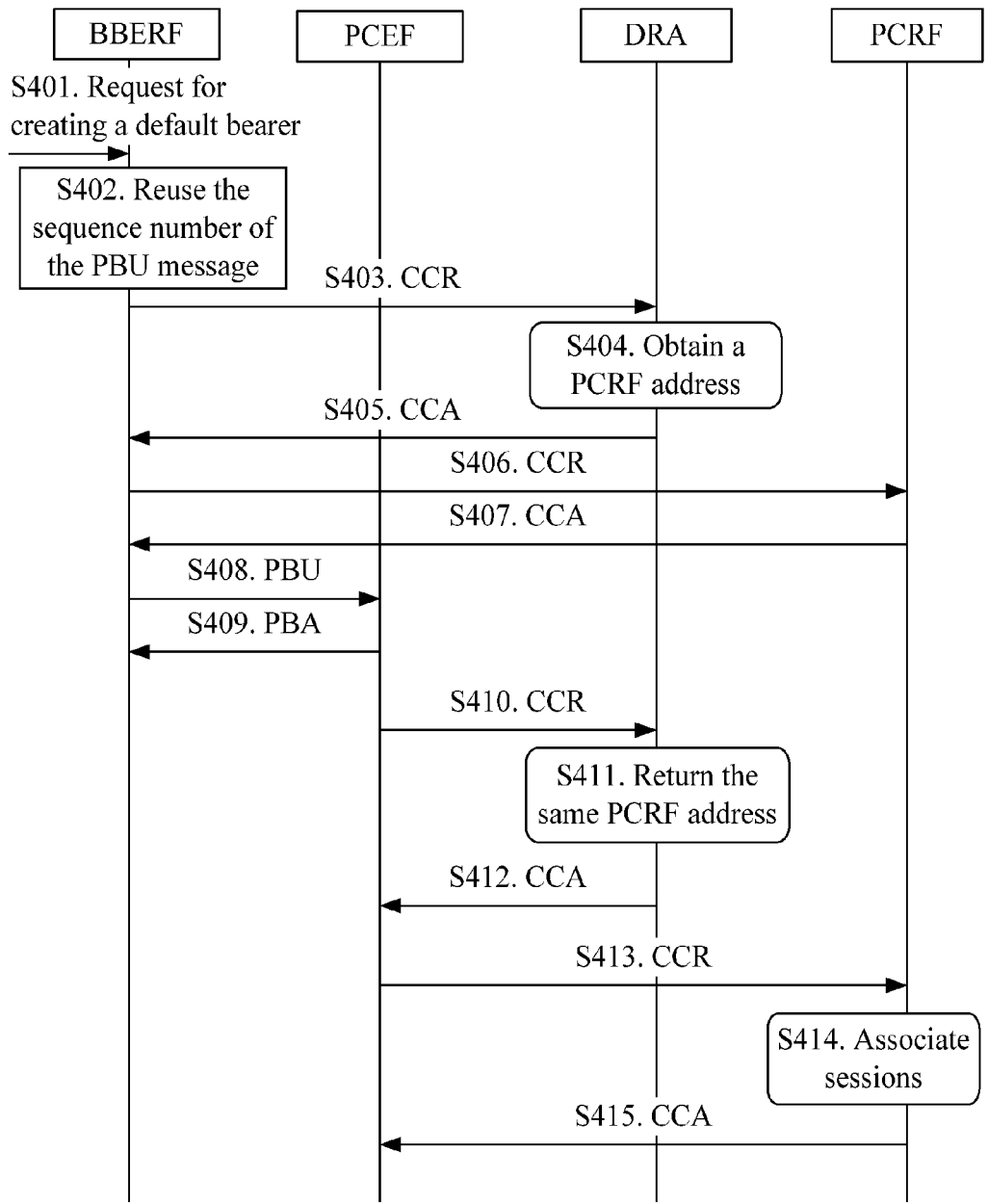
FIG. 4 is a flowchart of a session association method provided in a fourth embodiment of the present invention.

A session association method is provided in the fourth embodiment of the present invention. In this embodiment, an emergency service has no user ID, and the BBERF reuses the sequence number carried in the PBU message, reports the sequence number to the PCRF, and uses this sequence number for associating the IP-CAN session with the gateway control session. In this embodiment, the DRA is based on a redirect solution, and the DRA selects one of the PCRFs that support the emergency service. As shown in FIG. 4, the method includes the following steps:

Step S401: The BBERF receives a request for creating a default bearer. The request carries an APN of the emergency service and an IMEI of the emergency service.

Specifically, the request for creating the default bearer indicates that the default bearer is used for an emergency service, and carries only the IMEI of the emergency service. The request indicates that the user has no valid user ID. The BBERF is a functional entity. It may be a specific module and may be located on the access network gateway.

Step S402: When the BBERF determines that the service is an emergency service and that the user has no valid user ID, the BBERF reuses the sequence number in the PBU message (the PBU message carries the sequence number for matching the PBA message).

Specifically, the ongoing PBU message of each BBERF has a different sequence number. For example, if the BBERF is currently sending three PBU messages, the BBERF generates three different sequence numbers. When one of the PBUs is acknowledged, the sequence number of the PBU may be applied to a new PBU message, namely, the sequence number is unique in the BBERF in a certain time.

Step S403: The BBERF sends a gateway control session setup request message (that is, CCR) to the DRA. The message carries the sequence number and the APN of the emergency service.

Step S404: After receiving the CCR message, the DRA determines that the service is an emergency service and that the user has no valid user ID according to the emergency service APN carried in the CCR message. The DRA selects one of the PCRFs capable of handling emergency services, and generates an index for recording an association between the PCRF address and the sequence number and the BBERF address.

Step S405: The DRA returns a PCRF address through a response message.

Step S406: The BBERF sends a gateway control session setup request message (that is, CCR) to the PCRF according to the returned PCRF address. The message carries the sequence number and the APN of the emergency service.

Step S407: The PCRF returns a response message to the BBERF.

Step S408: The BBERF sends a PBU message to the PCEF. The message carries the sequence number and the APN of the emergency service.

Step S409: The PCEF returns a PBA message. The message carries the IP address allocated by the PCEF to the user.

Step S410: The PCEF sends an IP-CAN session setup request message (that is, CCR) to the DRA. The message carries the sequence number, the APN of the emergency service, and the IP address allocated to the user.

Step S411: The DRA searches the index table according to the sequence number and the BBERF address, returns a PCRF address which is the same as that in step S405, and deletes the sequence number information in the index table.

Step S412: The DRA sends a response message to the PCEF. The message carries the PCRF address.

Step S413: The PCEF sends an IP-CAN session setup request message (that is, CCR) to the PCRF according to the returned PCRF address. The message carries the sequence number, the APN of the emergency service, the address of the BBERF, and the IP address allocated to the user.

Step S414: The PCRF associates the IP-CAN session with the gateway control session according to the sequence number and BBERF address in the IP-CAN session setup request message, and the sequence number and BBERF address in the gateway control session setup request message.

Step S415: The PCRF returns a response message to the PCEF.

Therefore, in this embodiment, the gateway control session is associated with the IP-CAN session by using the sequence number in the PBU message; and the gateway control session is associated with the IP-CAN session when no user ID exists in the emergency service, which ensures the normal progress of the emergency service.

Figure 5:
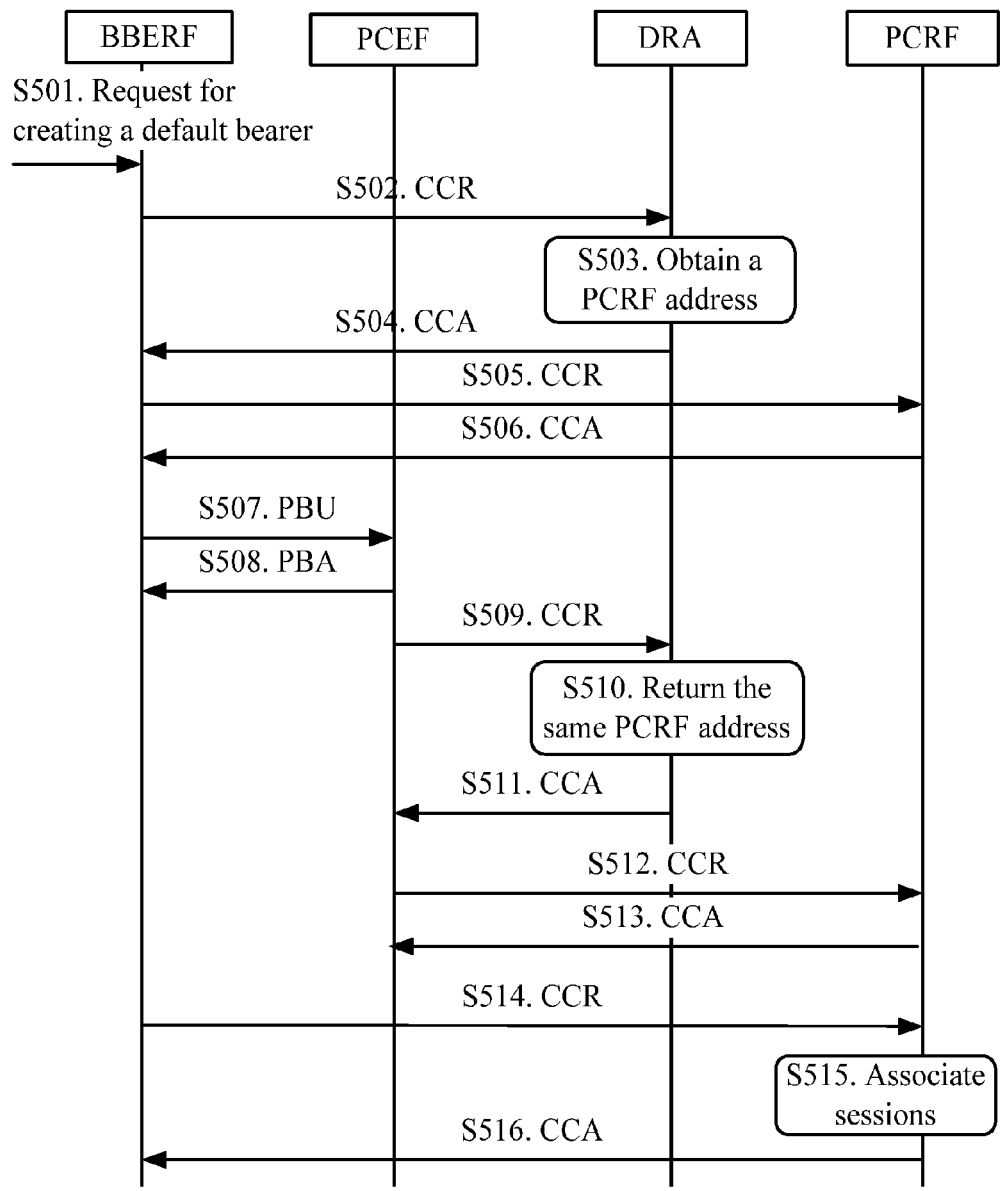
FIG. 5 is a flowchart of a session association method provided in a fifth embodiment of the present invention.

A session association method is provided in the fifth embodiment of the present invention. In this embodiment, an emergency service has no user ID; after the PCEF performs the PBU process, the PCEF obtains the IP address (Home Address address which is HoA address for short) allocated by the PCEF to the user, and sends a gateway control session update message to the PCRF. The message carries the HoA, and the HoA is unique in the PCEF and in the domain (namely, different HoA addresses are allocated to different users who perform the emergency service in the same PCEF). The PCRF associates the gateway control session with the IP-CAN session according to the HoA address. In this embodiment, the DRA is based on a redirect solution, and the DRA selects a unique PCRF for handling the emergency service. As shown in FIG. 5, the method includes the following steps:

Step S501: The BBERF receives a request for creating a default bearer. The request carries an APN of the emergency service and an IMEI of the emergency service.

Specifically, the request for creating the default bearer indicates that the default bearer is used for an emergency service, and carries only the IMEI of the emergency service. The request indicates that the user has no valid user ID. The BBERF is a functional entity. It may be a specific module and may be located on the access network gateway, for example, a serving gateway in an SAE network, or an SGSN.

Step S502: The BBERF sends a gateway control session setup request message (that is, CCR) to the DRA. This message carries the APN of the emergency service.

Step S503: After receiving the CCR message, the DRA determines that the service is an emergency service and that the user has no valid user ID according to the emergency service APN carried in the CCR message. The DRA selects a PCRF capable of handling emergency services in this domain for the gateway control session.

Step S504: The DRA returns the address information of the PCRF to the BBERF through a response message (that is, CCA).

Step S505: The BBERF sends a gateway control session setup request message (that is, CCR) to the PCRF corresponding to the returned PCRF address. The message carries the APN of the emergency service.

Step S506: The PCRF returns a response message.

Step S507: The BBERF sends a PBU message to the PCEF. The message carries the APN of the emergency service.

Step S508: The PCEF returns a PBA message. The message carries the IP address allocated by the PCEF to the user.

Step S509: The PCEF sends an IP-CAN session setup request message (that is, CCR) to the DRA. The message carries the APN of the emergency service, and the IP address allocated to the user.

Step S510: When the DRA determines that the service is an emergency service and that the user has no valid user ID according to the APN of the emergency service, the DRA selects a PCRF capable of handling emergency services in this domain for the IP-CAN session.

Step S511: The DRA returns the address information of the PCRF to the PCEF through a response message (that is, CCA).

Step S512: The PCEF sends an IP-CAN session setup request message (that is, CCR) to the PCRF according to the returned PCRF address. The message carries the APN of the emergency service and the IP address allocated to the user.

Step S513: The PCRF determines that the service is an emergency service and that no user ID is carried, and therefore, returns a response message to the PCEF directly without associating the session.

Step S514: The BBERF determines that the service is an emergency service and that no user ID is carried, and therefore, sends a gateway control session update message to the PCRF after receiving the IP address of the user from the PCEF, where the message carries the IP address.

Specifically, step S514 is performed after step S507, and may be performed before, during or after steps S508-S513.

Step S515: After receiving the session update message from the BBERF again, the PCRF uses the IP address to associate the gateway control session with the IP-CAN session.

Step S516: The PCRF returns a response message to the BBERF.

Therefore, in this embodiment, the gateway control session is associated with the IP-CAN session by using an IP address allocated to the user; and the gateway control session is associated with the IP-CAN session when no user ID exists in the emergency service, which ensures the normal progress of the emergency service.

Figure 6:
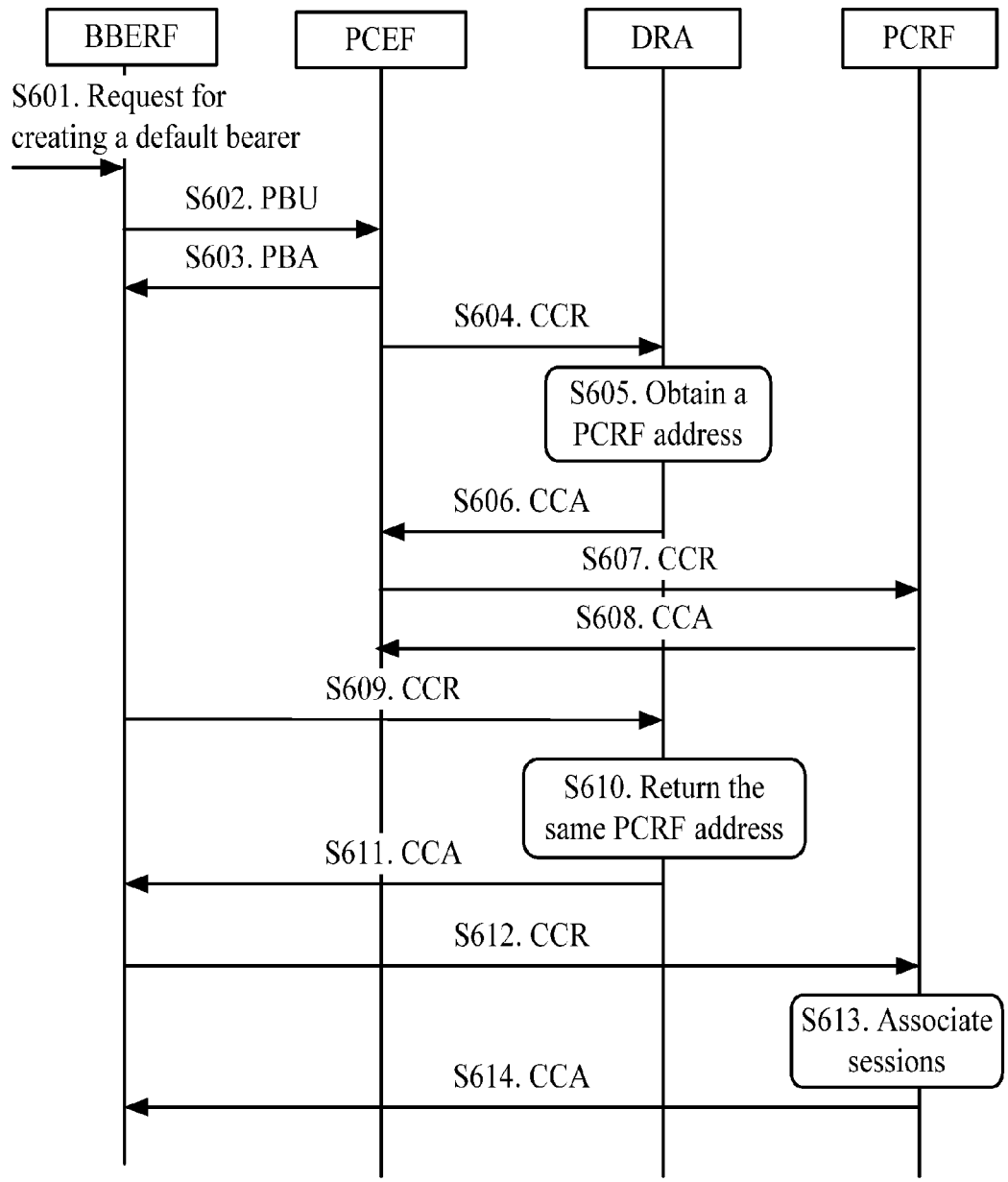
FIG. 6 is a flowchart of a session association method provided in a sixth embodiment of the present invention.

A session association method is provided in the sixth embodiment of the present invention. In this embodiment, an emergency service has no user ID; after obtaining the IP address allocated to the user, the BBERF reports the IP address to the PCRF through a gateway control session setup message; and the PCRF uses this IP address to associate the IP-CAN session with the gateway control session. In this embodiment, the DRA is based on a redirect solution, and the DRA selects one of the PCRFs that support the emergency service. As shown in FIG. 6, the method includes the following steps:

Step S601: The BBERF receives a request for creating a default bearer. The request carries an APN of the emergency service and an IMEI of the emergency service.

Specifically, the request for creating the default bearer indicates that the default bearer is used for an emergency service, and carries only the IMEI of the emergency service. The request indicates that the user has no valid user ID. The BBERF is a functional entity. It may be a specific module and may be located on the access network gateway.

Step S602: The BBERF determines that the service is an emergency service and that no user ID is carried, and therefore, sends a PBU message to the PCEF directly without setting up a gateway control session, where the message carries the APN of the emergency service.

Step S603: The PCEF returns a PBA message. This message carries the IP address allocated by the PCEF to the user.

Step S604: The PCEF sends an IP-CAN session setup request message (that is, CCR) to the DRA. This message carries the APN of the emergency service and the IP address allocated to the user.

Step S605: After receiving the CCR message, the DRA determines that the service is an emergency service and that the user has no valid user ID according to the emergency service APN carried in the CCR message. The DRA selects one of the PCRFs capable of handling emergency services, and generates an index for recording an association between the PCRF address and the IP address allocated to the user.

Step S606: The DRA returns the PCRF address to the PCEF through a response message.

Step S607: The PCEF sends an IP-CAN session setup request message (that is, CCR) to the PCRF according to the returned PCRF address. The message carries the APN of the emergency service and the IP address allocated to the user.

Step S608: The PCRF returns a response message to the PCEF directly.

Step S609: The BBERF determines that the service is an emergency service and that no user ID is carried, and therefore, sends a gateway control session setup message to the DRA after receiving the IP address of the user from the PCEF, where the message carries the IP address and the APN of the emergency service.

Specifically, step S609 is performed after step S604, and may be performed before, during or after steps S605-S608.

Step S610: The DRA searches the index table according to the IP address, and returns a PCRF address which is the same as that in step S605.

Step S611: The DRA returns the PCRF address to the BBERF through a response message.

Step S612: The BBERF sends a gateway control session setup message to the PCRF.

Step S613: After receiving gateway control session setup message from the BBERF again, the PCRF uses the IP address to associate the gateway control session with the IP-CAN session.

Step S614: The PCRF returns a response message to the BBERF.

Therefore, in this embodiment, the gateway control session is associated with the IP-CAN session by using an IP address allocated to the user; and the gateway control session is associated with the IP-CAN session when no user ID exists in the emergency service, which ensures the normal progress of the emergency service.

A session association system is provided in an embodiment of the present invention. The system includes: a BBERF, configured to send a gateway control session message to a PCRF; a PCEF, configured to send an IP-CAN session setup message to the PCRF; and the PCRF, configured to associate an IP-CAN session with a gateway control session according to a temporary ID in the IP-CAN session setup message and a temporary ID in the gateway control session message.

Further, the system includes a DRA, which is configured to obtain the address of the PCRF to enable the PCRF to receive the IP-CAN session setup message and the gateway control session message.

Figure 7:
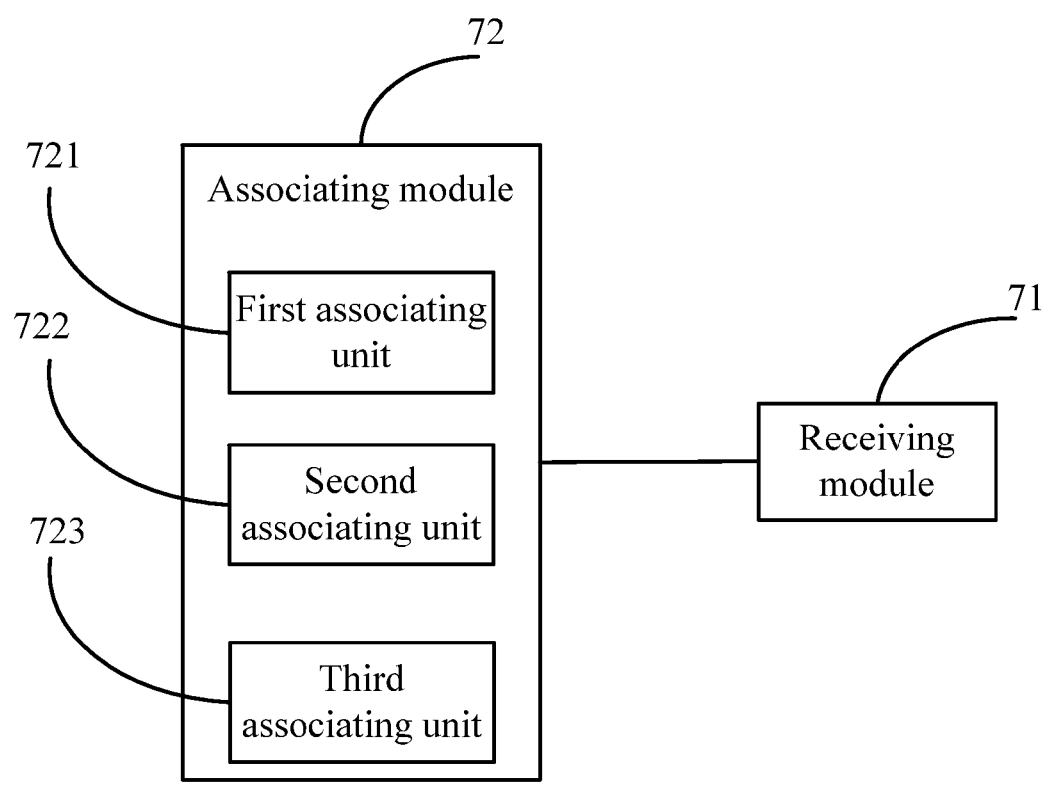
FIG. 7 shows a structure of a session association apparatus provided in a seventh embodiment of the present invention.

As shown in FIG. 7, a session association apparatus provided in the seventh embodiment of the present invention includes:

a receiving module 71, configured to receive an IP-CAN session setup message and a gateway control session message; and an associating module 72, configured to associate an IP-CAN session with a gateway control session according to a temporary ID in the IP-CAN session setup message received by the receiving module 71 and a temporary ID in the gateway control session message received by the receiving module 71.

Further, the associating module 72 includes:

a first associating unit 721, configured to associate the IP-CAN session with the gateway control session according to a temporary global ID in the IP-CAN session setup message and a temporary global ID in the gateway control session setup message;

a second associating unit 722, configured to associate the IP-CAN session with the gateway control session according to a sequence number in the PBU message in the IP-CAN session setup message or a sequence number in the PBU message in the gateway control session setup message; and a third associating unit 723, configured to associate the IP-CAN session with the gateway control session according to an IP address allocated to the user in the IP-CAN session setup message and an IP address allocated to the user in the gateway control session update message.

Therefore, in this embodiment, the gateway control session is associated with the IP-CAN session by using a temporary ID; and the gateway control session is associated with the IP-CAN session when no user ID exists in the emergency service, which ensures the normal progress of the emergency service.

After reading the foregoing embodiments, those skilled in the art clearly learn that the present invention may be implemented through hardware, or through software in addition to a necessary universal hardware platform. Therefore, the technical solution under the present invention may be embodied as a software product. The software product may be stored in a non-volatile storage medium (such as a CD-ROM, a USB flash disk, or a mobile hard disk), and may include several instructions that enable a computer device (such as a personal computer, a server, or a network device) to perform the methods provided in the embodiments of the present invention.

It should be noted that the above descriptions are merely exemplary embodiments of the present invention, and that persons having ordinary skill in the art may make various improvements and refinements without departing from the principle of the invention. All such modifications and refinements shall be covered by the present invention.

What is claimed is:

1. In a Policy and Charging Rules Function (PCRF), a session association method, comprising the steps:

receiving an Internet Protocol Connectivity Access Network (IP-CAN) session setup message and a gateway control session message; and associating an IP-CAN session with a gateway control session according to a temporary identity (ID) contained in both the IP-CAN session setup message and the gateway control session message; wherein the temporary ID is generated by a Bearer Binding and Event Reporting Function (BBERF).

2. The method according to claim 1, wherein the associating the IP-CAN session with the gateway control session according to the temporary ID in the IP-CAN session setup message and the gateway control session message step comprises:

associating the IP-CAN session with the gateway control session according to a temporary global ID in the IP-CAN session setup message and the gateway control session setup message.

3. The method according to claim 2, wherein:

the temporary global ID is unique, and comprises at least one of the set of identification combinations consisting of:

an ID of the BBERF and time of receiving a request for creating a default bearer, and the ID of the BBERF and a preset integer.

4. The method according to claim 1, wherein before the receiving the IP-CAN session setup message and the gateway control session message step, the method further comprises:

obtaining, by a Diameter Routing Agent (DRA), an address of a Policy and Charging Rules Function (PCRF) to enable the PCRF to receive the IP-CAN session setup message and the gateway control session message.

5. The method according to claim 4, wherein:

a PCRF capable of handling emergency services is obtained according to an ID of an emergency service when the DRA obtains the address of the PCRF.

6. The method according to claim 4, wherein:

an index for recording an association between the temporary ID and the address of the PCRF is generated when the DRA obtains the address of the PCRF.

7. A session association system, comprising:

a Bearer Binding and Event Reporting Function (BBERF), configured to send a gateway control session message to a Policy and Charging Rules Function (PCRF);

a Policy and Charging Enforcement Function (PCEF), configured to send an Internet Protocol Connectivity Access Network (IP-CAN) session setup message to the PCRF; and the PCRF, configured to associate an IP-CAN session with a gateway control session according to a temporary identity (ID) in the IP-CAN session setup message and the temporary ID in the gateway control session message.

8. The system according to claim 7, further comprising:

a Diameter Routing Agent (DRA), configured to obtain an address of the PCRF to enable the PCRF to receive the IP-CAN session setup message and the gateway control session message.

9. A session association apparatus, comprising:

a receiving module, configured to receive an Internet Protocol Connectivity Access Network (IP-CAN) session setup message and a gateway control session message; and an associating module, configured to associate an IP-CAN session with a gateway control session according to a temporary identity (ID) contained in both the IP-CAN session setup message and the gateway control session message; wherein the temporary ID is generated by a Bearer Binding and Event Reporting Function (BBERF).

10. The apparatus according to claim 9, wherein the associating module comprises:

a associating unit, configured to associate the IP-CAN session with the gateway control session according to a temporary global ID in the IP-CAN session setup message and the temporary global ID in the gateway control session setup message.

11. The apparatus according to claim 10, wherein:

the temporary global ID is unique, and comprises at least one of the set of identification combinations consisting of:

an ID of the BBERF and time of receiving a request for creating a default bearer, and the ID of the BBERF and a preset integer.

* * * * *